（12） United States Patent
Shimizume et al.

(10) Patent No.: US 6,269,061 B1
(45) Date of Patent: Jul. 31, 2001

(54) SERVO CONTROL SYSTEM FOR DISK PLAYER

(75) Inventors: Kazutoshi Shimizume; Mamoru Akita, both of Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 08/317,390

(22) Filed: Oct. 4, 1994

(30) Foreign Application Priority Data

Oct. 7, 1993 (JP) .................................................. 5-277906
Oct. 8, 1993 (JP) .................................................. 5-277790
Oct. 15, 1993 (JP) ................................................. 5-281681
Oct. 15, 1993 (JP) ................................................. 5-281682

(51) Int. Cl.[7] .............................................. G11B 7/005

(52) U.S. Cl. .................. 369/47.3; 369/47.44; 369/47.33

(58) Field of Search ........................... 369/44.29, 44.31, 369/44.35, 44.32, 44.27, 47, 50, 54, 47.28, 47.34, 47.44, 47.49, 53.31

(56) References Cited

U.S. PATENT DOCUMENTS

| Re. 32,194 | 6/1986 | Machida et al. . |
| 4,439,849 | 3/1984 | Nabeshima . |
| 4,543,650 | 9/1985 | Wachi . |
| 4,603,412 | 7/1986 | Yamazaki . |
| 4,743,979 | 5/1988 | Okano et al. . |
| 4,796,247 | 1/1989 | Vogelsang . |
| 4,908,810 | 3/1990 | Oie . |
| 5,124,808 | 6/1992 | Yokogawa . |
| 5,163,035 | 11/1992 | Horikiri . |
| 5,170,386 | 12/1992 | Tateishi . |
| 5,212,678 | * 5/1993 | Roth et al. .................... 369/44.23 X |
| 5,241,251 | * 8/1993 | Wakui ........................... 369/44.29 X |
| 5,323,367 | * 6/1994 | Tamura et al. ................ 369/44.29 X |
| 5,345,347 | * 9/1994 | Hopkins et al. ....................... 360/71 |
| 5,442,608 | * 8/1995 | Umeda et al. ..................... 369/44.27 |
| 5,471,442 | * 11/1995 | Shimizume .................... 369/44.32 X |
| 5,502,700 | * 3/1996 | Shinada .................................. 369/50 |
| 5,615,187 | * 3/1997 | Shinada ............................... 369/50 X |

FOREIGN PATENT DOCUMENTS

| 4103973 | 8/1992 | (DE) . |
| 0123946 | 11/1984 | (EP) . |
| 0469579 | 2/1992 | (EP) . |
| 0550097 | 7/1993 | (EP) . |
| 0578124 | 1/1994 | (EP) . |
| 0355919 | 2/1990 | (FR) . |
| 4268249 | 9/1992 | (JP) . |
| WO 89 05506 | 6/1989 | (WO) . |

OTHER PUBLICATIONS

Patent Abstracts of Japan, Tezuka *Recorder*, Oct. 25, 1988 vol. 12 No. 401, Group No. P776 (JP 63–142217).*
Patent Abstracts of Japan, vol. 18, No. 159, p–1711, Mar. 16, 1994, for JP 5–325506.

(List continued on next page.)

*Primary Examiner*—W. R. Young
(74) *Attorney, Agent, or Firm*—Ronald P. Kananen; Rader, Fishman & Grauer

(57) ABSTRACT

A servo control system for a shock-proof disk player comprising a digital signal processor, a voltage-controlled oscillator, a reference clock generator, a clock mode changeover switch, a phase comparator for controlling a head-rotating spindle motor, and a bulk memory of a large capacity for storage of data, wherein the phase lock of a PLL at the time of a seek is switched on or off under control to thereby shorten the required seek time. The clock signal frequency is selectively changed in such a manner as to lock the PLL in accordance with the rotation rate, whereby the power consumption can be lowered. The bulk memory is used as a data buffer, and the servo system is controlled as the data are read out from the memory while the data quantity stored and left therein is detected, so that a reduction of the power consumption can be achieved with another advantage of enhancing the resistance against shock.

7 Claims, 8 Drawing Sheets

OTHER PUBLICATIONS

Patent Abstracts of Japan, vol. 17, No. 596 (P–1636), Oct. 29, 1993 & JP–A–05 174 385 (Alpine Electron Inc.) Jul. 13, 1993.

Patent Abstracts of Japan, vol. 18, No. 159 (P–1711), Mar. 16, 1994, & JP–A–05 325 506 (Alpine Electron Inc.) Dec. 10, 1993.

European Search Report Re: Application No. EP 94 40 2253, dated Jun. 9, 1995.

Patent Abstract of Japan vol. 17 No. 563 (P–1628) Oct. 12 1993 & JP–A–05 159 460 (Alpine Electron Inc) Jun. 25, 1993.

Patent Abstract of Japan vol. 16 No. 502 (P–1438) Oct. 16, 1992 & JP–A–04 181 547 (Sony Corp.) Jun. 29, 1992.

Patent Abstract of Japan vol. 18 No. 184 (P–1719) Mar. 29, 1994 & JP–A–05 342 585 (Sharp Corp) Dec. 24, 1993.

Patent Abstract of Japan vol. 17 No. 58 (P–1481) Feb. 4, 1993 & JP–A–04 268 249 (Sony Corp) Sep. 24, 1992.

Patent Abstract of Japan vol. 17 No. 505 (P–1611) Sep. 10, 1993 JP–A–05 128 531 (Sharp Corp) May 25, 1993.

* cited by examiner

SERVO CONTROL SYSTEM FOR DISK PLAYER

BACKGROUND OF THE INVENTION

The present invention relates to a disk player for reproducing recorded audio data from a digital audio disk such as CD (Compact Disc) or MD (Mini Disc) (hereinafter referred to as disk), and more particularly to a disk player wherein the audio data reproduced from a disk are once stored in a bulk memory of a large capacity and then are read out therefrom to be outputted. And the invention further relates to a servo system for use in such a disk player.

In disk players inclusive of CD players, there is known a shock-proof type of which construction is so contrived that, when any track jump is caused during reproduction of recorded data due to some external disturbance such as shock, the continuity of the reproduced data is maintained to prevent occurrence of any sound skip.

Here, "track jump" signifies a phenomenon that a data-reading light spot of an optical pickup for reading out the recorded data while following up a record track (pit string) on a disk jumps the record track.

In an ordinary CD player, a data rate for reproduction of the recorded data from a disk (hereinafter referred to as reproduction data rate) is equal to a data rate for outputting the audio data (hereinafter referred to as output data rate).

However, in any conventional shock-proof type CD player, a disk is driven at a higher rotation speed which is twice the normal speed in an ordinary CD player, so that the data are read at a reproduction data rate higher than that in the ordinary CD player and, while the read data thus obtained are stored temporarily in a bulk memory of a large capacity, the stored data are read from the bulk memory at the same output data rate as in the ordinary CD player.

And when there occurs a track jump during data reproduction, the data-reading light spot of the optical pickup is returned to the position immediately before occurrence of such a track jump, and the data reproduction is resumed from that position while the reproduced audio data obtained after resumption of the reproduction are linked, by utilizing the stored data in the bulk memory, to the preceding audio data reproduced immediately before occurrence of the track jump, whereby the continuity of the reproduced audio data is maintained to consequently prevent generation of any sound skip.

Furthermore, in the known construction where the normal rotation speed of a disk is twice the velocity in an ordinary CD player, each of servo systems for focus, tracking, sled and spindle control is kept in operation, and when the data quantity stored in the bulk memory has exceeded a preset value, the result of monitoring the stored data quantity is detected as an overflow, and then a reverse jump of, e.g., one track is repeated in a standby state.

As described, in the conventional shock-proof type CD player of the above construction, a disk is normally driven to rotate at a high speed and each servo system is kept in operation, so that the power consumption is naturally increased, and this problem is considered to be a disadvantage particularly in a portable CD player where low power consumption is requisite.

There is known another shock-proof CD player proposed by the present applicant (as disclosed in Japanese Patent Laid-open No. Hei 4 (1992)-268249), wherein a disk rotation rate is changed to a double speed (high speed mode) only in response to occurrence of a track jump caused by some external disturbance such as shock, and storage of data into a bulk memory of a large capacity is performed fast, but the disk is driven at a regular speed (low speed mode) in any other case to consequently realize a reduction of the power consumption.

In the above shock-proof CD player, when a servo circuit for controlling the rotation of a disk-driving spindle motor switches the driving operation from a low speed mode to a high speed mode or vice versa, the frequency division ratio of a clock signal used as a reference for speed control is gradually changed, and pitch control is executed with respect to the period of such clock signal to thereby produce a frequency error signal, and the rotation speed of the spindle motor is controlled in accordance with the frequency error signal thus obtained.

As mentioned, in the conventional rotation servo circuit which executes pitch control with respect to the period of a clock signal serving as a reference for speed control, ideal speed control is achievable on the one hand, but due to the necessity of employing a voltage-controlled oscillator (VCO) and a phase-locked loop (PLL) circuit, there exist some problems including that the circuit configuration is complicated and the production cost is raised.

The spindle (rotation) servo system adopted in the above known example has a rotation servo circuit which comprises a rough servo system for pulling the disk rotation speed approximately into a desired precision range and a phase lock servo system for attaining a higher precision after the control action of the rough servo system. This phase lock servo system has a secondary loop structure which consists of a phase loop for executing a phase locking control in accordance with the phase difference between a reproduced sync signal and a reference sync signal, and a speed loop for measuring the period of a reproduced frame sync signal obtained from the disk and equalizing the frequency thereof to a reference frequency of 7.35 kHz. Meanwhile the rough servo system has a primary loop structure which extracts the lowest-frequency component of the reproduced signal and equalizes the frequency of the extracted component to the reference frequency.

In the control action of the rotation servo circuit, first the disk rotation speed is pulled approximately into the desired precision range by the rough servo system.

As a result, the phase-locked loop (PLL) of the phase lock servo system is locked to attain a state where data is reproducible from the disk. When the PLL is thus locked, the primary-loop rough servo system is switched to the secondary-loop phase lock servo system.

However, in the conventional rotation servo circuit of the above-described construction, there arises a problem that a phase-locked state is not held at the moment the rough servo system is switched over to the phase lock servo system, although the disk rotation speed is substantially kept stable. And in an exemplary case where the frame jitter margin is set to ±27 frames and the existing deviation is a maximum of 27 frames, it follows that such state is forcibly pulled into synchronism to consequently cause a disorder in the rotation speed at this moment, whereby the PLL is induced to be out of phase.

If the PLL is rendered out of phase in this manner, it is impossible to read each subcode recorded as an index for the data on a disk. Therefore, an operation of reading the subcode becomes possible posterior to the lapse of a fixed time which is required until the disk rotation speed is stabilized after the rough servo system is switched to the phase lock servo system.

In a seek for replacing an optical pickup to a desired address position (target address position) on a disk, as shown in FIG. 1, there are performed a series of operations of first switching the phase lock servo system to the rough servo system, then replacing the pickup in the radial direction of the disk by a distance corresponding to a required number of tracks, subsequently switching the rough servo system to the phase lock servo system after the disk rotation speed has reached approximately to its regular linear velocity, and reading the subcode from the disk. The above operations are repeated until the pickup has arrived at the target address position.

Therefore, if the disk rotation speed is disordered at the moment of switching the rough servo system to the phase lock servo system as described, a speed disorder is caused at each time of the repeated operations of switching from the rough servo system to the phase lock servo system during the seek, whereby the time required for reading out the subcode is prolonged to eventually fail in shortening the seek time.

Particularly in reproduction of data from a CD-ROM or the like where a fast seek is necessary, any disorder of the disk rotation speed causes a waste of time in reading out the subcode, hence raising an important problem in realizing fast seek.

OBJECTS AND SUMMARY OF THE INVENTION

It is a first object of the present invention to provide a disk player which is adapted to achieve low power consumption and is capable of maintaining the continuity of reproduced data despite occurrence of any track jump.

A second object of the present invention resides in providing a rotation servo circuit adapted for realizing low power consumption in and low cost production of a shock-proof disk player.

And a third object of the present invention is to provide a rotation servo circuit for use in a disk player where a subcode can be read from a disk at the time of switching from a rough servo system to a phase lock servo system to thereby attain the great reduction of a seek time.

In the disk player of the above construction, a disk is played while being rotated at a higher speed (e.g., 4-fold speed) than a normal or regular speed, and the data reproduced from the disk are stored in a bulk memory of a large capacity, while the stored data are read out successively from the memory at a normal output data rate.

The data quantity stored in the bulk memory is continuously monitored, and the entire servo systems are turned off when the memory has become full of the data. In such off-state, the stored data in the bulk memory are successively read and outputted therefrom.

When the bulk memory has become substantially empty, the entire servo systems are turned on again, then the optical pickup is displaced back to the final read position corresponding to the preceding turn-off of the servo systems, and the high speed reproduction is resumed from the link point, whereby the on-time period of each servo system is shortened to consequently lower the power consumption.

In the rotation servo circuit of the present invention for use in a shock-proof disk player employing a bulk memory of a large capacity, there are prepared a high speed mode and a low speed mode for driving a disk, and the high speed mode is selected only at the occurrence of a track jump to thereby realize low power consumption in the disk player.

Also in this rotation servo circuit, two clock signals of mutually different frequencies corresponding to the two driving modes are prepared as reference clock signals for speed control, and one of such clock signals of different frequencies is adequately selected to switch the driving mode. Since the structural requisite is merely to switch the frequency of the reference clock signal, the circuit configuration can be simplified to consequently lower the production cost of the disk player.

Further the rotation servo circuit of the invention is contrived in such a manner that, at the time of switching from a rough servo system to a phase lock servo system in a seek, only the speed loop of the phase lock servo system is closed so that the phase lock servo system functions as a primary loop.

At the time of switching the servo system, the phase of the reproduced sync signal is somewhat disordered, but none of forcible phase pull-in action is executed, whereby the rotation speed of the disk is kept stable.

If the disk rotation speed is thus stable, the operation of reading out a subcode can be performed without any problem even when some disorder of the phase is existent. Accordingly it becomes possible to read out the subcode immediately after switching the servo system, hence eliminating the waste of time for reading out the subcode to eventually shorten the required seek time.

In the disk player representing another aspect of the present invention, the frequency of the output from an oscillator means is controlled in accordance with a disk speed control signal, while the oscillation output is supplied as a system clock signal to a signal processor means.

And the disk rotation speed is controlled on the basis of the phase difference between the oscillation output and the reference clock signal, whereby the system clock signal is so changed that the speed control signal becomes zero.

Consequently, when a play mode is selectively switched between 1-fold speed play and 2-fold speed play, the spindle servo system can be locked even during the transition period of the rotation speed, so that the data are readable during such period as well.

In this shock-proof disk player, therefore, the 2-fold speed play mode is selected only at the occurrence of any track jump caused by external disturbance such as shock, and data charge into the bulk memory is performed rapidly, whereas the 1-fold speed play mode is selected at any other time to thereby realize wide reduction of the power consumption in the disk player.

In the disk player representing a further aspect of the invention, the output of an oscillator means and a reference clock signal are frequency-divided at variable ratios, and the disk rotation speed is controlled in accordance with the phase difference between the frequency-divided outputs. Meanwhile the play mode is selectively settable to either 1-fold speed play or 2-fold speed play by adequately selecting each frequency division ratio.

Also in the disk player of the invention, the output of the oscillator means is selected for rough control of the disk rotation speed, and subsequently the reference clock signal is selected after the disk rotation speed is stabilized posterior to arrival thereof at a preset desired velocity, whereby signal synchronization can be achieved with a digital-to-analog converter to eventually deliver a satisfactory audio output without any wow or flutter.

A further embodiment of the present invention may also encompass: a disk player having a first servo means for controlling the rotation speed of a disk and a second servo means for controlling the operation of an optical pickup which reads recorded data from the disk, wherein the data are read from the disk at a first data rate and then are stored in a bulk memory of a large capacity, while the stored data are read from the bulk memory at a second data rate lower than the first data rate. The disk player of the present embodiment may further include: a memory control means for monitoring the data quantity stored in the bulk memory and outputting a first control signal when the data quantity has exceeded a first preset value, and outputting a second control signal when the data quantity has become smaller than a second preset value lower than the first preset value; a servo control means for turning off the first and second servo means in response to the first control signal, or turning on the first and second servo means in response to the second control signal; a signal processor means for processing a reproduced signal obtained from a disk, detecting a speed difference between the rotation speed of the disk and a desired rotation speed thereof, and outputting a speed control signal corresponding to the detected speed difference; oscillator means for supplying an oscillation output as a system clock signal to the signal processor means; and speed control means for detecting the phase difference between the oscillation output and a reference clock signal, and controlling the rotation speed of the disk in accordance with the detected phase difference.

Another embodiment of the present invention may encompass a disk player having: signal processor means for processing a reproduced signal obtained from a disk, detecting a speed difference between the rotation speed of the disk and a desired rotation speed thereof, and outputting a speed control signal corresponding to the detected speed difference; oscillator means for supplying an oscillation output as a system clock signal to the signal processor means; and speed control means for detecting the phase difference between the oscillation output and a reference clock signal, and controlling the rotation speed of the disk in accordance with the detected phase difference. The present embodiment may further include: a bulk memory; a first servo means for controlling the rotation speed of a disk; a second servo means for controlling the operation of an optical pickup which reads recorded data from the disk, wherein the data are read from the disk at a first data rate and then are stored in the bulk memory, while the stored data are read out from the bulk memory at a second data rate lower than the first data rate; a memory control means for monitoring the data quantity stored in the bulk memory and outputting a first control signal when the data quantity has exceeded a first preset value, or outputting a second control signal when the data quantity has become smaller than a second preset value lower than the first preset value; and a servo control means for turning off the first and second servo means in response to the first control signal, or turning on the first and second servo means in response to the second control signal.

Another embodiment of the present invention may encompass a disc player having: disc drive means for rotating a disc; an optical pick-up for reading information from the disc being driven by the disc drive means; circuit means operatively connected with the disc drive means and the optical pick-up, the circuit means for controlling at least one of the disc drive means and the optical pick up means in response to the an output of the optical pick up means, including: signal processing means for processing a signal from the optical pick-up; disk drive control means for controlling the rotational speed at which the disc is rotated by the disc drive means, the disc drive control means detecting the speed difference between the actual rotational speed and a desired rotational speed and for producing a speed control signal in accordance with the detected speed difference; a mass storage RAM for storing information read off the disc by the optical pick-up, the data being read from the disk at a first data rate and then stored in mass storage RAM, while the stored data is read out from the mass storage RAM at a second data rate lower than the first data rate; a memory control means for monitoring the data quantity stored in the bulk memory and outputting a first control signal when the data quantity has exceeded a first preset value, and outputting a second control signal when the data quantity has become smaller than a second preset value lower than the first preset value; and a servo control means for turning off the first and second servo means in response to the first control signal, and for turning on the first and second servo means in response to the second control signal. The present embodiment may further include: signal processor means for processing a reproduced signal obtained from a disk, detecting a speed difference between the rotation speed of the disk and a desired rotation speed thereof, and outputting a speed control signal corresponding to the detected speed difference; oscillator means for supplying an oscillation output as a system clock signal to the signal processor means; and speed control means for detecting the phase difference between the oscillation output and a reference clock signal, and controlling the rotation speed of the disk in accordance with the detected phase difference.

A further embodiment of the present invention may encompass a disc player having: disc drive means for rotating a disc; an optical pick-up for reading information from the disc being driven by the disc drive means; circuit means operatively connected with the disc drive means and the optical pick-up, the circuit means for controlling at least one of the disc drive means and the optical pick up means in response to an output of the optical pick up means, including: signal processing means for processing a signal from the optical pick-up; disk drive control means for controlling the rotational speed at which the disc is rotated by the disc drive means, the disc drive control means detecting the speed difference between the actual rotational speed and a desired rotational speed and for producing a speed control signal in accordance with the detected speed difference; a mass storage RAM for storing information read off the disc by the optical pick-up, the data being read from the disk at a first readout rate and then stored in mass storage RAM, while the stored data is read out from the mass storage RAM at a second readout rate lower than the first data rate; memory control means for monitoring the data quantity stored in the bulk memory and outputting a first control signal when the data quantity has exceeded a first preset value, and outputting a second control signal when the data quantity has become smaller than a second preset value lower than the first preset value; and servo control means for modifying an operation of each of the first and second servo means in a first predetermined manner in response to the first control signal, and for modifying the operation of each of the first and second servo means in a second predetermined manner in response to the second control signal. The present embodiment may also include: signal processor means for processing a reproduced signal obtained from a disk, detecting a speed difference between the rotation speed of the disk and a desired rotation speed thereof, and outputting a speed control signal corresponding to the detected speed difference; oscillator means for supplying an oscillation output as a system clock signal to the signal processor means; and speed control means for detecting the phase difference between the oscillation output and a reference clock signal, and controlling the rotation speed of the disk in accordance with the detected phase difference.

DETAILED DESCRIPTION OF THE PREFERRED EMBODIMENTS

Hereinafter some preferred embodiments of the present invention will be described in detail with reference to the accompanying drawings.

Figure 2:
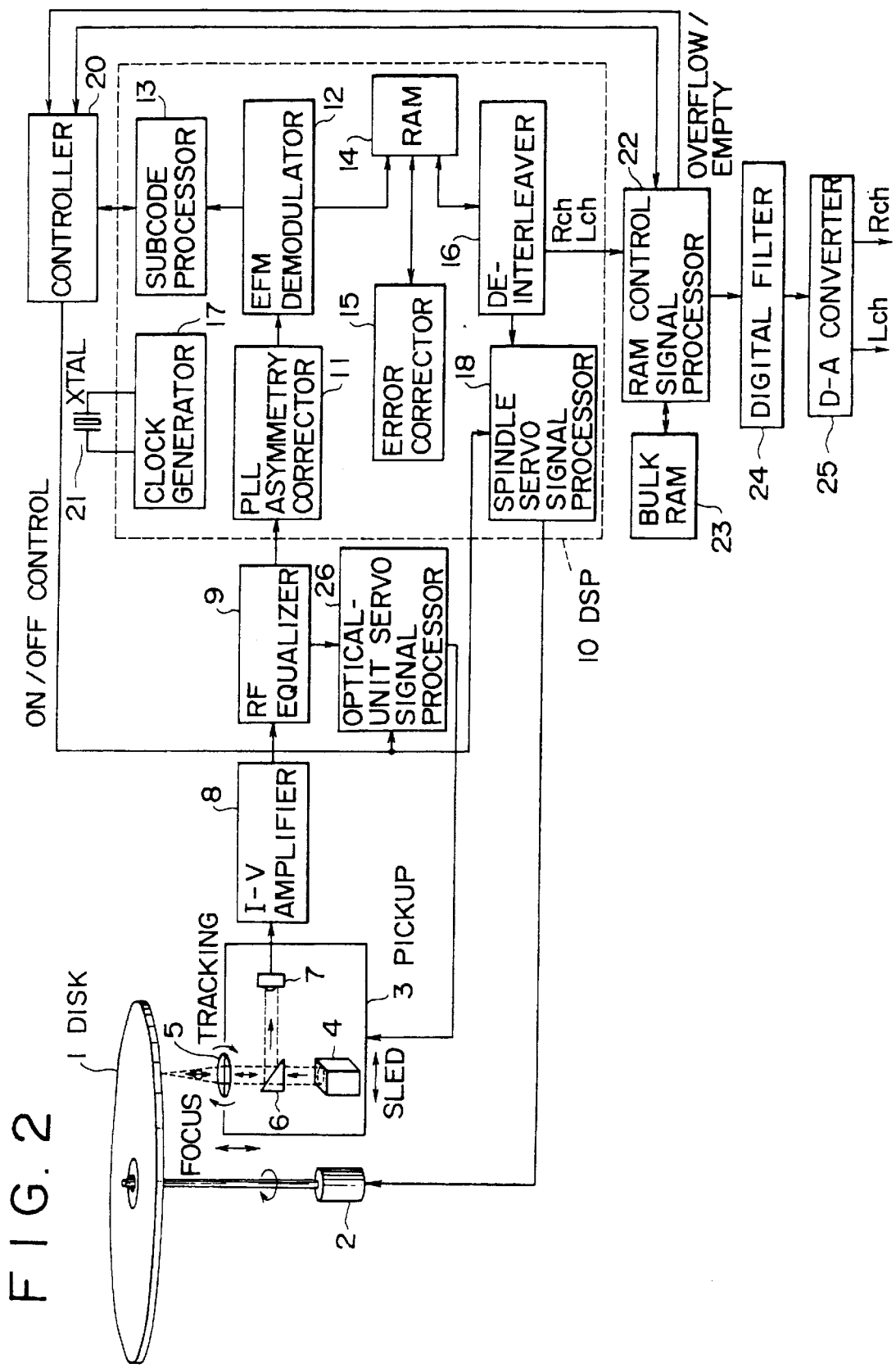
FIG. 2 is a block diagram of a 1st embodiment of the present invention applied to a CD player.

FIG. 2 is a block diagram showing a 1st embodiment of the present invention applied to, e.g., a CD player.

In this diagram, a disk (CD) 1 is driven by a spindle motor 2, and recorded data are read from the disk 1 by an optical pickup (hereinafter referred to simply as pickup) 3.

It is assumed in this embodiment that the disk 1 is rotated at a 4-fold speed higher than a normal regular speed in an ordinary CD player.

The pickup 3 comprises a laser diode 4; an objective lens 5 for converging a laser beam, which is emitted from the laser diode 4, to form a data-reading light spot on the signal plane of the disk 1; a polarized beam splitter 6 for changing the travel direction of the laser beam reflected from the disk 1; and a photo detector 7 for receiving the reflected laser beam. The pickup 3 is displaceable in the radial direction of the disk by a driving source such as a sled feed motor (not shown).

The pickup 3 further comprises, although not shown, a tracking actuator for displacing the data-reading light spot to a record track on the disk 1 in the radial direction of the disk, and a focus actuator for moving the objective lens 5 along its optical axis.

The output signal of the pickup 3 is supplied to an I-V (current-voltage) amplifier 8 where the current signal is converted into a voltage signal, which is waveform-shaped in an RF equalizer 9 and then is supplied to a DSP (digital signal processor) 10.

Now a description will be given on how the signal is processed in the DSP 10.

First in a PLL asymmetry corrector 11, a binary signal is obtained with execution of asymmetry correction, and successive clock pulses are generated by a PLL (phase-locked loop) structure in synchronism with the edge of the binary signal. Here, "asymmetry" signifies a state where the center of the eye pattern of the RF signal deviates from the center of the amplitude.

Subsequently, EFM (eight-to-fourteen modulation) data are demodulated in an EFM demodulator 12, whereby digital audio data and an error correction-detection parity code are obtained, and simultaneously the subcode recorded immediately after the frame sync signal is also demodulated.

The subcode thus demodulated in the EFM demodulator 12 is supplied via a subcode processor 13 to an undermentioned controller 20.

The data after the EFM demodulation are once stored in a RAM 14, and error correction is executed in an error corrector 15 on the basis of the error correction-detection parity code. Then the error-corrected data are deinterleaved in a deinterleaver 16 so that the data are decoded from CIRC (cross interleave Reed-Solomon code).

The data processed in the DSP 10 are once stored in a bulk RAM 23 of a large capacity via a RAM control signal processor 22.

The data thus stored in the bulk RAM 23 are read out therefrom via the RAM control signal processor 22 at a data rate equal to ¼ of the rate for data reproduction from the disk 1, i.e., at the normal output data rate in an ordinary CD player. And after being filtered through a digital filter 24, the data are converted into analog data in a D-A converter 25 and then are delivered as audio outputs of left (L) and right (R) channels.

The bulk RAM 23 is used for preventing a sound skip by maintaining the continuity of the reproduced audio data when any track jump has occurred during a reproduction mode due to some external disturbance such as shock.

Occurrence of a track jump is detected by continuously monitoring the subcode in the controller 20 and recognizing the discontinuity of a time code included in the subcode.

More specifically, upon occurrence of a track jump during data reproduction, the data-reading light spot of the pickup 3 is returned to the position immediately before the track jump, and then the data reproduction is resumed from that position while the audio data reproduced posterior to resumption of the reproduction are linked to the audio data reproduced immediately before occurrence of the track jump and stored in the bulk memory 23.

The ratio between the data writing rate in the bulk RAM 23 and the data reading rate therefrom is 4:1, i.e., the data are written at a 4-fold higher speed in comparison with the data reading speed, so that there soon occurs an overflow of the data in the bulk RAM 23. It is therefore necessary to continuously monitor the data quantity stored in the bulk RAM 23.

The operation of monitoring the data quantity in the bulk RAM 23 is performed in the RAM control signal processor 22.

More specifically, the RAM control signal processor 22 recognizes the last address of the data written in the bulk RAM 23 as a definite address, and also recognizes the address of the read data as an address 0.

And when the data quantity in the bulk RAM 23 has exceeded a first preset value, the RAM control signal processor 22 determines an overflow of the bulk RAM 23 on the basis of the definite address and outputs an overflow signal (first control signal). Meanwhile, when the data quantity has become smaller than a second preset value which is lower than the first preset value, the RAM control signal processor 22 determines that the bulk RAM 23 is approximately empty, and then outputs an empty signal (second control signal). Thus, the signal processor 22 functions as a memory control means.

The RAM control signal processor 22 continuously feeds the recognized definite address to the controller 20 while supplying thereto an overflow signal or an empty signal.

The controller 20 consists of a CPU and recognizes the definite address, which is obtained from the RAM control signal processor 22, as a definite subcode in correspondence to the subcode.

The controller 20 further functions as a servo control means which, on the basis of the overflow signal/empty signal supplied from the RAM control signal processor 22, executes on/off control of a spindle servo signal processor (first servo means) 18 for controlling the rotation speed of the spindle motor 2, and also on/off control of an optical-unit servo signal processor (second servo means) 26 for controlling the tracking, focus and sled servo system relative to the operation of the pickup 3.

More specifically, the controller 20 turns off the spindle servo signal processor 18 and the optical-unit servo signal processor 26 in response to an overflow signal outputted from the RAM control signal processor 22, or turns on the spindle servo signal processor 18 and the optical-unit servo signal processor 26 in response to an empty signal outputted from the RAM control signal processor 22.

Figure 3:
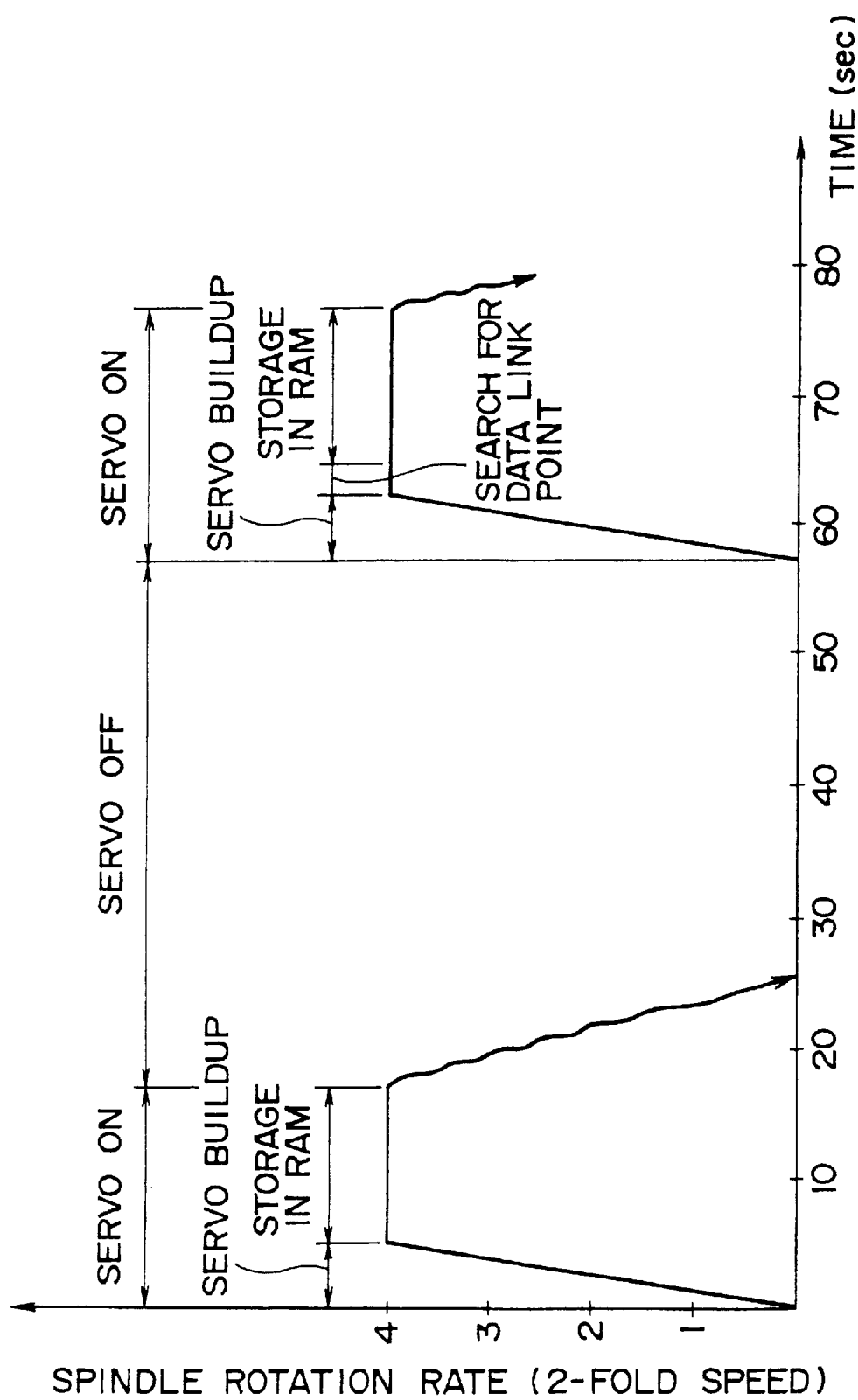
FIG. 3 graphically shows the operating characteristics of a servo system for explaining the operation of the 1st embodiment of the invention.

The operation of the above construction will now be described below with reference to FIG. 3 which graphically shows the operating characteristics of the servo system.

Upon start of reproduction, the controller 20 first turns on the signal processors 18 and 26 of the servo systems. In this embodiment, the rotation speed (spindle rotation rate) of the disk 1 is set to be higher four times in comparison with the normal speed in an ordinary CD player.

When the disk 1 is rotated at a 4-fold speed after a buildup of the spindle servo system, the pickup 3 starts its data reading operation, and the read data are once stored in the bulk RAM 23 after a predetermined signal process in the DSP 10.

The data recorded on the disk 1 are composed of digital signals sampled at a frequency of 44.1 kHz and quantized with linear 16-bit strings. Therefore, when the rotation speed of the disk 1 is raised to be higher four times, the data reproduction rate from the disk 1, i.e., the data write rate into the bulk RAM 23, is expressed as $$(44.1 \text{ kHz} \times 2(L,R) \times 16) \times 4 \approx 5.64 \text{ [Mbits/sec]} \qquad \text{Eq. (1)}$$

Assuming here that a 64-Mbit DRAM (or four 16-Mbit DRAMs) is employed as the bulk RAM 23, the above data write rate is calculated as $$64/5.64 \approx 11.34 \text{ [sec]} \qquad \text{Eq. (2)}$$

It follows that the bulk RAM 23 is filled with the stored data approximately in 11.34 seconds.

The data quantity stored in the bulk RAM 23 is continuously monitored by the RAM control signal processor 22.

The RAM control signal processor 22 monitors the data quantity in the bulk RAM 23 on the basis of the definite address and, upon excess of the stored data over a predetermined quantity (first preset value), outputs an overflow signal to the controller 20.

In response to the overflow signal, the controller 20 turns off the spindle servo signal processor 18 and the optical-unit servo signal processor 26.

In the off-state of each servo system, the operation of reading the data from the disk 1 is not performed, and audio reproduction is performed on the basis of the data stored in the bulk RAM 23.

Since the output data rate is ¼ of the reproduction data rate in this embodiment, a time period of approximately 45 ($\approx 11.34 \times 4$) seconds is required for reading out the entire data at the normal speed from the bulk RAM 23 in the full storage state.

As known, a time is required for a transition from the off-state of any servo system to the on-state thereof, and particularly for buildup of the spindle servo system to its steady operation. Accordingly, if each servo system is so actuated after the bulk RAM 23 has become completely empty, the reproduced sound is interrupted during such buildup time period needed until attainment of the steady operation.

For this reason, a time period of, e.g., 8 seconds is taken into account in advance for attaining the completely steady operating state of each servo system, and each servo system is turned on at the moment the data quantity (second preset value) corresponding to a read time period of 8 seconds or so is still left in the bulk RAM 23.

More specifically, the RAM control signal processor 22 monitors the stored data quantity in the bulk RAM 23 on the basis of the definite address and, when the data quantity has become smaller than the second preset value, the signal processor 22 judges that the bulk RAM 23 will be empty after a lapse of 8 seconds, and then outputs an empty signal to the controller 20.

In response to the empty signal, the controller 20 turns on the spindle servo signal processor 18 and the optical-unit servo signal processor 26.

Consequently, the entire servo systems inclusive of the spindle servo system are actuated to perform steady operations, thereby rotating the disk 1 at a 4-fold speed. Then the data-reading optical spot of the pickup 3 is displaced to the preceding last read position and resumes the data reading from that position. And the data thus read are stored in the bulk RAM 23 after a predetermined signal process in the DSP 10.

Thereafter the procedure described above is repeatedly executed.

As mentioned, the disk 1 is played at a 4-fold high speed and the reproduced data therefrom are once stored in the bulk RAM 23, while the data thus stored are successively read and outputted from the bulk RAM 23. And when the bulk RAM 23 has been filled with the stored data, the entire servo systems are turned off, but the data are continuously read and outputted from the bulk RAM 23. Thereafter, when the bulk RAM has become substantially empty, the entire servo systems are turned on again, and the 4-fold speed reproduction is resumed from the link point on the disk 1. As such operational procedure is executed repeatedly, the spindle servo signal processor 18 and the optical-unit servo signal processor 26 are held in operation merely during ¼ of the reproduction period but are kept at a halt during ¾ thereof, hence reducing the power consumption approximately to ¼.

In case a track jump is caused by some external disturbance such as shock during the time of storing the reproduced data into the bulk RAM 23, a data linking process is executed as in the prior art by first returning the data-reading light spot of the pickup 3 to the position immediately before occurrence of the track jump and, while utilizing the data stored in the bulk RAM 23, linking the reproduced audio data, which are obtained after resumption of the reproduction, to the audio data reproduced immediately before occurrence of the track jump.

Due to the procedure mentioned above, it becomes possible to maintain the continuity of the reproduced audio data to thereby prevent any sound skip, hence realizing a sufficient countermeasure against shock and so forth.

In a disk player equipped with an automatic disk changer, a disk is completely changeable if a time margin of 37 seconds (=45−8 seconds) or so is ensured.

Therefore, in an exemplary case of applying the above construction to a disk player equipped with an automatic disk changer, a disk changing operation may be performed during the off-time of the servo systems, whereby a plurality of disks are rendered playable continuously without any interruption of reproduced music.

The embodiment described above represents merely an example of applying the present invention to a CD player. However, it is to be understood that the present invention is not limited to such an example alone, and the invention is similarly applicable to any of other disk players designed for data reproduction from MD, CD-ROM and so forth.

According to the present invention, as mentioned hereinabove, a disk is played while being driven at a speed higher than the normal rotation speed, and the data reproduced therefrom are once stored in a bulk memory of a large capacity, while the stored data are read and outputted from the bulk memory at an ordinary output data rate. The data quantity stored in the bulk memory is continuously monitored and, when the bulk memory has been filled with the stored data, the entire servo systems are turned off. Thereafter, when the bulk memory has become substantially empty, the entire servo systems are turned on again, and the high speed reproduction is resumed from the link point on the disk. Consequently, in an exemplary case where 4-fold high speed reproduction is performed with use of a 64-Mbit memory, the on-state time of each servo system can be reduced approximately by ¼ or so to eventually reduce the power consumption. Accordingly, in the disk player of the present invention, low power consumption is ensured and the continuity of reproduced audio data can be maintained even at the occurrence of any track jump caused by shock or the like. Therefore, optimal application of the present invention is achievable particularly to a portable disk player or a car disk player where high shock-resisting performance is requisite and low power consumption needs to be realized due to a battery-driven structure thereof.

Since the off-time of each servo system is settable to a long period, when the present invention is applied to a disk player equipped with an automatic disk changer, a disk changing operation can be performed during the off-time of the servo system, hence attaining another advantageous effect that a plurality of disks are continuously playable without interruption of reproduced music.

Now a 2nd embodiment of the present invention will be described below.

The data processed through the DSP 10 shown in FIG. 2 are once stored in the bulk RAM 23 via the RAM control signal processor 22.

The data thus stored in the bulk RAM 23 are read out therefrom via the RAM control signal processor 22 and, after being filtered through the digital filter 24, the data are converted into analog form by the D-A converter 25 and then are delivered as audio outputs of left (L) and right (R) channels.

The bulk RAM 23 is used for preventing a sound skip by maintaining the continuity of the reproduced audio data when any track jump has occurred during a reproduction mode due to some external disturbance such as shock.

More specifically, upon occurrence of a track jump during data reproduction, the data-reading light spot of the pickup 3 is returned, under control of the controller 20, to the position immediately before the track jump, and then the data reproduction is resumed from that position while the audio data reproduced posterior to resumption of the reproduction are linked, under control of the RAM control signal processor 22, to the audio data reproduced immediately before occurrence of the track jump and stored in the bulk memory 23.

The DSP 10 includes a spindle servo signal processor (rotation servo circuit) 18 for controlling the rotation of the spindle motor 2 on the basis of the phase difference between a reproduced clock signal and a reference clock signal.

The optical-unit servo signal processor 26 functions to control the individual servo systems relative to the operations of the pickup 3, i.e., the tracking servo system for enabling the data-reading light spot to follow the record track on the disk 1, the focus servo system for continuously focusing the light spot on the signal plane of the disk 1, and the sled servo system for controlling the position of the pickup 3 in the radial direction of the disk.

The spindle servo signal processor 18 rotates the spindle motor 2, which drives the disk 1, normally in a low speed mode but, upon occurrence of a track jump, switches the rotation to a high speed mode, and subsequently rotates the spindle motor 2 in the low speed mode again after the bulk RAM 23 has been filled with the stored data in the high speed mode.

It is defined here that the low speed mode signifies a driving mode to rotate the spindle motor 2 at a speed slightly higher than the regular rotation speed (1-fold speed) in an ordinary CD player, e.g., 1.33-fold speed; and the high speed mode signifies a driving mode to rotate the spindle motor 2 at a further higher speed, e.g., 2-fold speed.

The action of switching the driving mode of the spindle motor 2 is performed in response to a mode switching signal obtained from the controller 20.

The controller 20 continuously monitors the subcode during data reproduction in the low-speed mode, and recognizes occurrence of a track jump by detecting the discontinuity of a time code included in the subcode, and outputs a high-level signal for switching the driving mode of the spindle motor 2 to the high speed mode.

In this stage of the operation, the controller 20 searches for the last subcode with respect to the continuity, then returns the pickup 3 to the position immediately before occurrence of the track jump, and controls the pickup 3 to resume the data reproduction from that position while controlling the RAM control signal processor 22 in such a manner as to link the reproduced audio data thereto.

The reason for selection of 2-fold speed reproduction in the high speed mode will be described below. When a 4-Mbit memory for example is used as the bulk RAM 23, the rate of charging the the bulk RAM 23 with the data is equal to the difference between the rate of writing the data in the bulk RAM 23 and the rate of reading the data therefrom, i.e., (2-fold rate−1-fold rate).

Since the data recorded on the disk 1 are composed of digital signals sampled at a frequency of 44.1 kHz and quantized with linear 16-bit strings, the time required for charging the bulk RAM 23 is expressed as $$4,194,304 \text{ bits}/(44.1 \text{ kHz} \times 2(L,R) \times 16) \text{ bits} \times 1 = 2.97 \text{ [sec]} \quad \text{Eq. (3)}$$

The above time of approximately three seconds indicates a period during which sound can be reproduced without any interruption if no data is reproduced from the disk 1 due to occurrence of a track jump. This time period raises substantially no problem in practical use, and it is determined by the storage capacity of the bulk RAM 23 and the reproduction speed, i.e., reproduction data rate, in a high speed mode.

When an overflow signal is outputted from the RAM control signal processor 22 during data reproduction in the high speed mode, the controller 20 generates a low level mode switching signal in response to such overflow signal so as to switch the driving mode of the spindle motor 2 to the low speed mode.

As the rate of writing the data in the bulk RAM 23 is higher than the rate of reading the data therefrom, the bulk RAM 23 is soon caused to overflow. It is therefore necessary to continuously monitor the data quantity stored in the bulk RAM 23.

The operation of monitoring the data quantity in the bulk RAM 23 is performed in the RAM control signal processor 22.

More specifically, the RAM control signal processor 22 recognizes the last address of the data written in the bulk RAM 23 as a definite address, and also recognizes the address of the read data as an address 0. The signal processor 22 monitors the data quantity on the basis of such definite address, and outputs an overflow signal when the data quantity has exceeded a preset value.

The RAM control signal processor 22 continuously feeds the recognized definite address to the controller 20 while supplying an overflow signal thereto.

The controller 20 consists of a CPU and recognizes the definite address, which is obtained from the RAM control signal processor 22, as a definite subcode in correspondence to the subcode.

Figure 4:
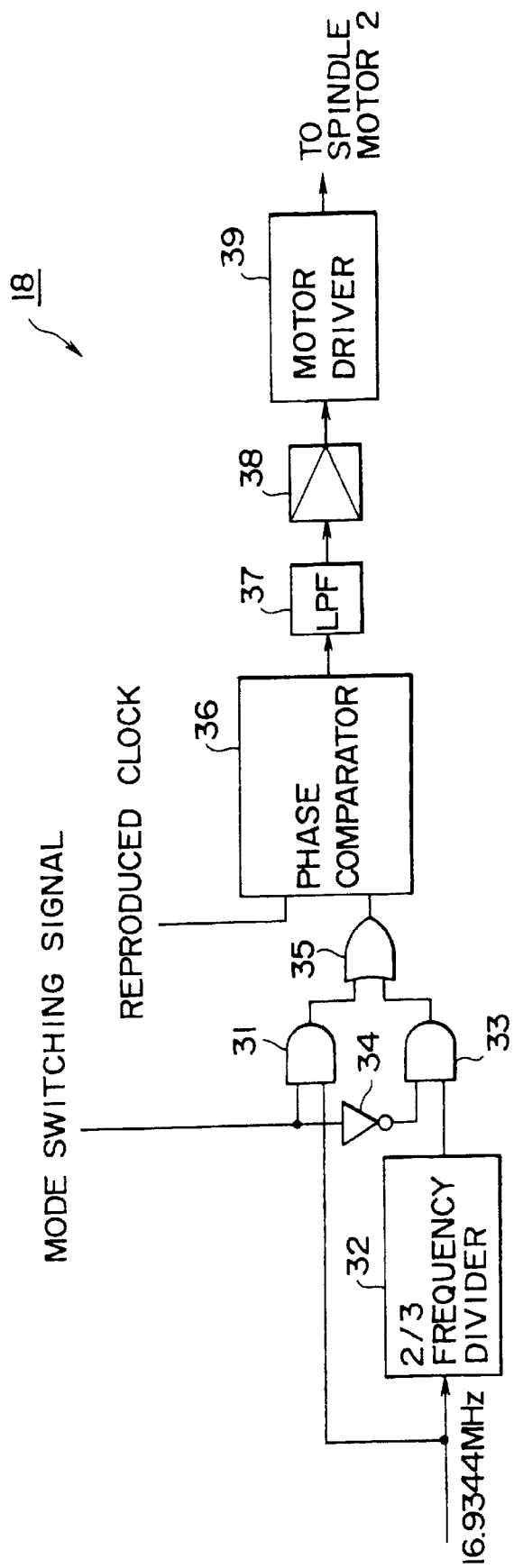
FIG. 4 is a block diagram of a 2nd embodiment of the present invention representing a spindle servo signal processor (rotation servo circuit)

FIG. 4 is a block diagram of the spindle servo signal processor (rotation servo circuit) 18 used in the 2nd embodiment of the present invention.

Figure 1:
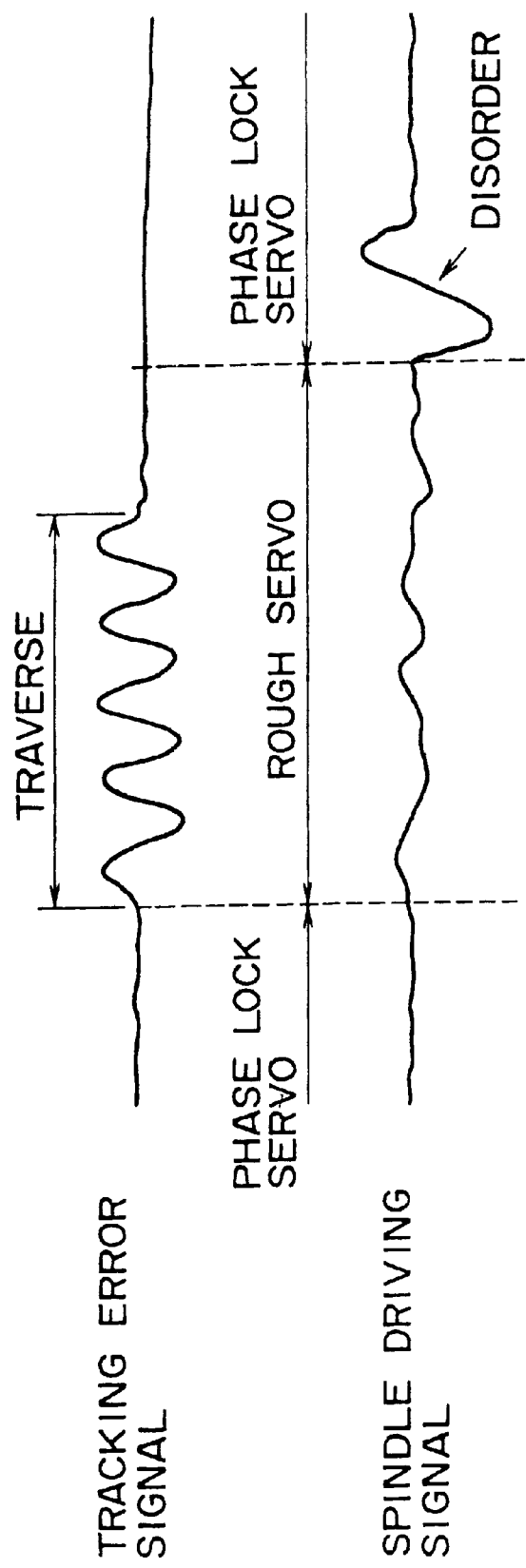
FIG. 1 is an explanatory diagram illustrating a seek operation in the related art.

In this diagram, a signal of 16.9344 MHz (44.1 kHz×384) obtained from the clock generator 17 (see FIG. 1) is supplied as one input to an AND gate 31 while being supplied also to a ⅔ frequency divider 32, where a clock signal of 11.2896 MHz is produced by frequency division, and then this clock signal is supplied as one input to an AND gate 33.

A mode switching signal outputted from the controller 20 (see FIG. 1) is supplied as another input to the AND gate 31. Meanwhile this signal is inverted by an inverter 34 and then is supplied as another input to the AND gate 33. The output clock signals of the AND gates 31 and 33 are supplied to an OR gate 35, from which a reference clock signal is outputted.

A gate circuit consisting of such AND gates 31, 33, inverter 34 and OR gate 35 generates a reference clock signal of 16.9334 MHz when the mode switching signal is at a high level, or generates a reference clock signal of 11.2896 MHz when the mode switching signal is at a low level.

The reference clock signal is supplied to a phase comparator 36. Then the phase comparator 36 compares the phase of the reproduced clock signal, which is in synchronism with the data reproduced from the disk 1, with the phase of the reference clock signal to thereby detect the phase difference between the two clock signals and outputs a phase difference signal. This phase difference signal is supplied as a spindle error signal to a motor drive 39.

In the spindle servo signal processor 18 having the above-described circuit configuration, the feature of the present invention resides in that the reference clock frequency can be adequately selected in accordance with the mode switching signal, and it is to be noted that the circuit for generating a spindle error signal on the basis of the reference clock signal is not limited to the above configuration.

If a high-level mode switching signal is outputted from the controller 20 upon occurrence of a track jump due to external disturbance such as shock during a 1.33-fold low speed reproduction mode based on the reference clock signal of 11.2896 MHz, the spindle servo signal processor 18 switches the reference clock frequency from 11.2896 MHz to 16.9334 MHz, thereby changing the operation to a 2-fold high speed reproduction mode based on the reference clock signal of 16.9334 MHz.

And during the aforementioned time period of three seconds, the procedure of linking the data and charging the bulk RAM 23 with the data are executed for maintaining the continuity of the reproduced audio data.

Meanwhile, when the bulk RAM 23 has reached an overflow state, an overflow signal is outputted from the RAM control signal processor 22, and then a low-level mode switching signal is outputted from the controller 20 in response to such an overflow signal. Subsequently the spindle servo signal processor 18 switches the reference clock frequency from 16.9334 MHz to 11.2896 MHz, thereby changing the operation to the 1.33-fold low speed reproduction mode based on the reference clock signal of 11.2896 MHz.

The reason for setting the rate in the low-speed mode to 1.33-fold instead of 1-fold will now be described below.

For the purpose of simplifying the circuit configuration, the spindle servo signal processor 18 is so formed as to switch merely the reference clock frequency. Therefore a time period of approximately one second or so is required until the whole system is completely locked after the driving mode is switched.

And the data are read out successively from the bulk RAM 23 even during such a time period of one second, so that the data quantity corresponding to one second is rendered insufficient in the bulk RAM 23.

Consequently, when a 2-fold high speed mode is changed to a low speed mode after extinction of an external disturbance such as shock, the reproduction data rate and the output data rate are rendered equal to each other in 1-fold speed reproduction, whereby the insufficiency of the data corresponding to one second is not eliminated, and the data are kept insufficient until the next 2-fold high speed reproduction. It follows therefore that, upon occurrence of a next external disturbance, the bulk RAM 23 is charged with the data only for two seconds.

However, in this embodiment where the data are reproduced at a 1.33-fold speed, the bulk RAM 23 can be charged with the data gradually while a normal reproducing operation is performed. It is to be understood that the data reproduction rate in the low speed mode is not limited to a 1.33-fold speed alone, and any rate slightly higher than a 1-fold speed may be selected as well.

Figure 5:
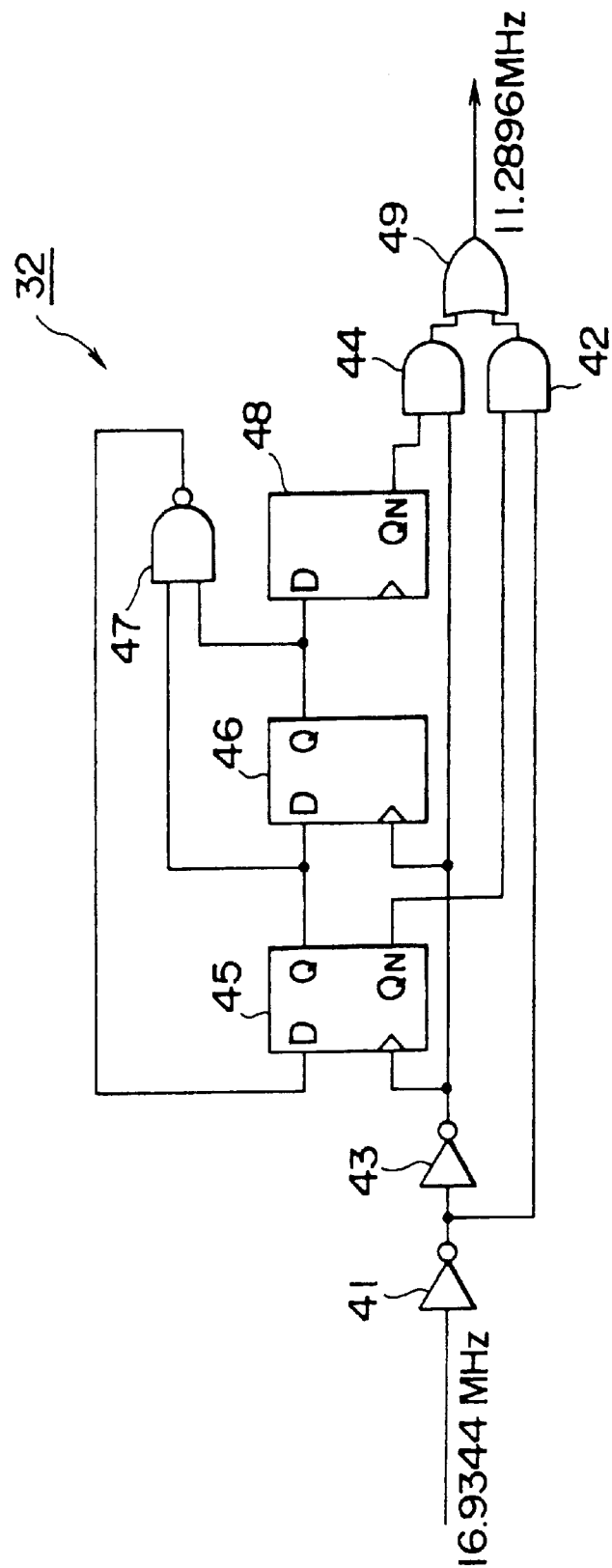
FIG. 5 is a block diagram of a 3rd embodiment of the present invention which represents a specific circuit configuration of a frequency divider employed in the servo system of FIG. 3.

FIG. 5 is a block diagram of a 3rd embodiment representing a specific circuit configuration of the ⅔ frequency divider shown in FIG. 4.

In this block diagram, a clock signal of 16.9334 MHz is inverted by an inverter 41 and is supplied as one input to an AND gate 42. The signal is further inverted by another inverter 43 and then is supplied as one input to an AND gate 44 and also as a clock input to each of D flip-flops 45 and 46.

A Q output of the D flip-flop 45 is supplied as a D (data) input to the D flip-flop 46 and also as one input to a NAND gate 47. Meanwhile a QN output (inverse of Q output) of the D flip-flop 45 is supplied as another input to the AND gate 42.

A Q output of the D flip-flop 46 is supplied as a D input to a D flip-flop 48 and also as another input to the NAND gate 47. And an output of the NAND gate 47 is supplied as a D input to the D flip-flop 45.

A QN output of the D flip-flop 48 is supplied as another input to the AND gate 44. And respective outputs of the AND gates 42 and 44 are supplied as two inputs to an OR gate 49.

In the logic circuit of the above configuration, a clock signal of 11.2896 MHz, which is produced by ⅔ frequency division of a clock signal of 16.9334 MHz, is obtained as an output of the OR gate 49.

Although the embodiment mentioned above represents an exemplary case of applying the present invention to a CD player, it is to be understood that the present invention is not limited to such an example alone and may be applied to any of other disk players designed for data reproduction from MD, CD-ROM and so forth.

Thus, in the rotation servo circuit of the present invention for use in a shock-proof disk player employing a bulk memory of a large capacity, there are prepared a high speed mode and a low speed mode for driving a disk, and the high speed mode is selected only at the occurrence of a track jump. Further, two clock signals of mutually different frequencies corresponding to the two driving modes are prepared as reference clock signals for speed control, and one of such clock signals of different frequencies is adequately selected to switch the driving mode, so that the structural requisite is merely to switch the frequency of the reference clock signal selectively, whereby the circuit configuration can be simplified to consequently lower the production cost of the disk player.

Next a description will be given on a 4th embodiment of the present invention.

Figure 6:
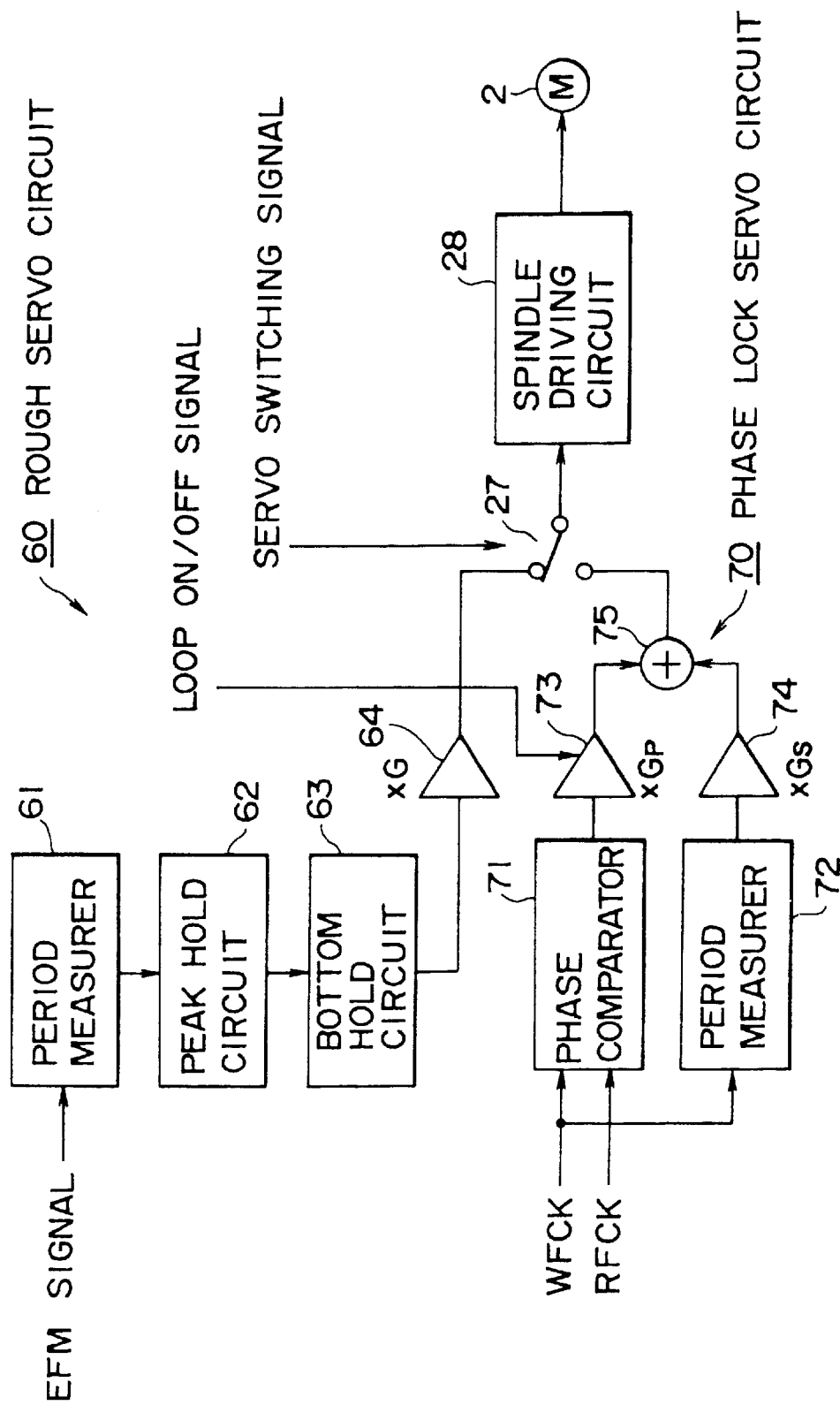
FIG. 6 is a block diagram of a CD player corresponding to a 4th embodiment of the present invention.

FIG. 6 is a block diagram of the spindle servo signal processor (rotation servo circuit) 18 in the 4th embodiment of the invention.

As shown in this diagram, the spindle servo signal processor 18 according to the invention comprises a rough servo circuit (first servo circuit) 60 for pulling the rotation speed of the disk 1 approximately into its precision range, and a phase lock servo circuit (second servo circuit) 70 for executing a high-precision control action after the operation of the rough servo circuit 60.

In the rough servo circuit 60, a period measurer 61 functions to measure the period of a frame-sync corresponding portion in an EFM signal reproduced from the disk 1, thereby detecting the minimum frequency signal 11T (T: fundamental unit length of pit) on the disk 1.

The signal 11T thus obtained is passed through a peak hold circuit 62 and a bottom hold circuit 63, so that any signal component greater than 11T and generated due to some flaw or the like is screened, whereby the original reproduced frame sync signal is detected.

The reproduced frame sync signal is multiplied by G in an amplifier 64 and then is supplied via a changeover switch 27 to a spindle drive 28.

The rotation speed of the spindle motor 2 is so controlled that the period of the reproduced frame sync signal is equalized to the reference time length of 2.544 $\mu$sec ($\approx 11/4.3218 \times 10^6$).

As for the rough servo circuit 60, the construction disclosed in, e.g., Japanese Patent Publication No. Hei 1 (1989)-35419 may be used as well.

Meanwhile the phase lock servo circuit 70 is formed into a secondary loop structure which consists of a phase loop for executing a phase locking control in accordance with the phase difference detected by a phase comparator 71 between a reference clock signal RFCK and a reproduced clock signal WFCK of a period ranging from one reproduced frame sync signal to another reproduced frame sync signal, and a speed loop for measuring the period of the reproduced clock signal WFCK by means of a period measurer 72 and controlling the measured period in such a manner as to equalize the frequency thereof to a reference frequency of 7.35 kHz.

As for the phase lock servo circuit 70, the construction disclosed in, e.g., Japanese Patent Laid-open No. Hei 2 (1990)-101676 may be used as well.

In the phase lock servo circuit 70, the output of the phase comparator 71 is multiplied by $G_P$ in an amplifier 73, while the output of the period measurer 72 is multiplied by $G_S$ in an amplifier 74. The respective outputs of the two amplifiers 73 and 74 are added to each other in an adder 75, whose output is then supplied via the changeover switch 27 to the spindle drive 28, whereby the aforementioned control action is executed.

The operation of switching the servo systems in the spindle servo signal processor 18 is performed by actuating the changeover switch 27 in response to a servo switching signal outputted from the controller 20 (see FIG. 2).

More specifically, first the switch 27 is changed to turn on the rough servo circuit 60. which then pulls the disk rotation speed approximately into its precision range to thereby lock the PLL in the phase lock servo circuit 70, so that reproduction of the data from the disk 1 is rendered possible.

Immediately after the PLL is locked, the switch 2 is changed again to turn on the phase lock servo circuit 70 while turning off the rough servo circuit 60, whereby the primary-loop rough servo system is switched to the secondary-loop phase lock servo system.

In a seek mode, as described before, the pickup 3 is displaced in the radial direction of the disk 1 after the phase lock servo system is switched to the rough servo system, and when the rotation speed of the disk 1 has reached approximately its predetermined linear velocity with a displacement of the pickup 3 corresponding to a predetermined number of tracks, the phase lock servo system is turned on again and the subcode is read out from the disk 1. Such a series of operations are repeatedly performed until the pickup 3 has arrived at a desired target address position.

Figure 7:
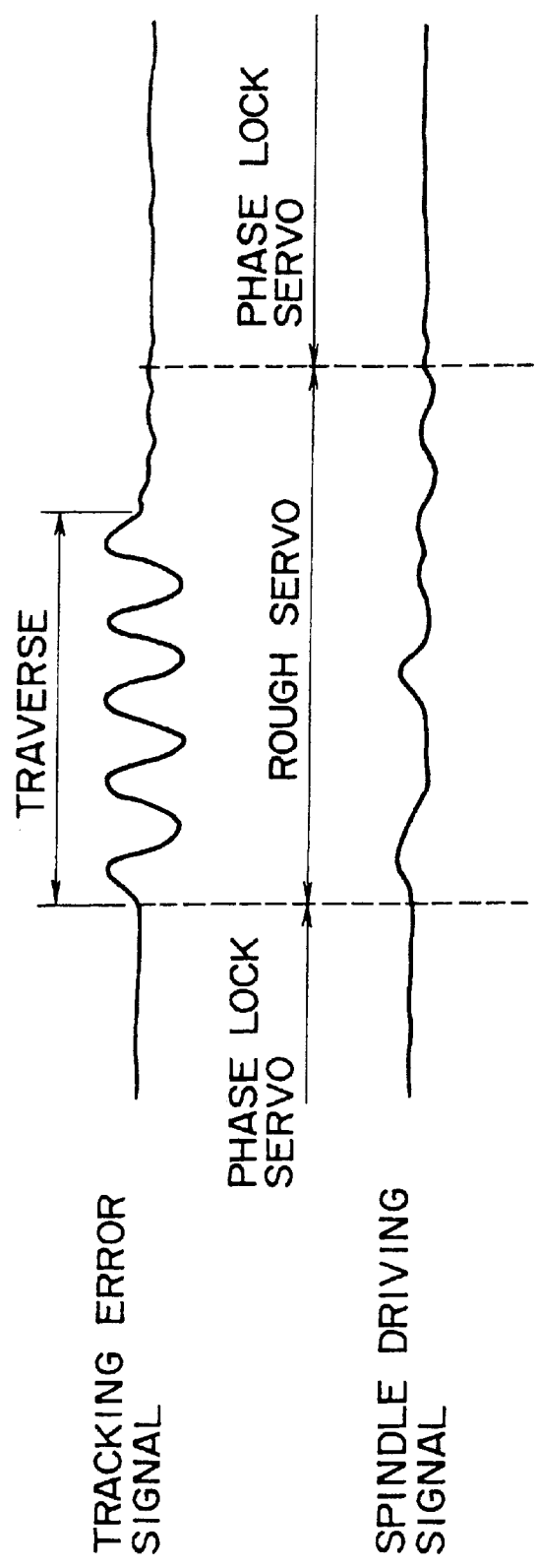
FIG. 7 is an explanatory diagram illustrating a seek operation performed in the CD player of FIG. 6.

As the pickup 3 is displaced in the radial direction of the disk 1 in the seek mode, the data-reading light spot traverses the record tracks (pit strings), so that a sinusoidal tracking error signal is generated during the traverse period shown in FIG. 7. And the number of tracks traversed by the data-reading light spot is counted on the basis of such a tracking signal.

This embodiment is so contrived that, when the rough servo system is switched to the phase lock servo system at the time of a seek, the gain $G_P$ of the amplifier 73 on the phase loop side is set to -■ in response to a loop on/off signal outputted from the controller 20 (see FIG. 2).

Therefore, when the rough servo system is switched to the phase lock servo system in the seek mode, the phase lock servo system functions as a primary loop structure where the phase loop is opened and only the speed loop is closed.

In this manner, the phase loop of the phase lock servo system is opened at a transition from rough servo to phase lock servo, so that none of forcible phase pull-in action is executed. Consequently, as shown in FIG. 7, the rotation speed of the disk 1 is not disordered immediately after switching of the servo systems and is kept substantially stable. Thereafter the rotation speed of the disk 1 is controlled merely by the speed loop alone in the primary loop structure.

In such a state under control of the phase lock servo system in the primary loop structure, the rotation speed of the disk 1 is maintained stable even if the phase is not locked, whereby no problem is raised in reading out the subcode.

As a result, at the time of a seek when the rough servo system and the phase lock servo system are switched alternately and repeatedly, the subcode can be read immediately after such switching, so that any waste of time in reading the subcode is eliminated to consequently realize wide reduction of the required seek time.

However, in reproducing PCM audio data, proper deinterleave fails to be performed in the deinterleaver 16 (see FIG. 2) if a phase-locked state is not ensured. Therefore it is necessary in such a case to execute speed control by a secondary loop structure where both of the phase and speed loops are closed in the phase servo lock system.

The 4th embodiment mentioned above represents an exemplary case of applying the present invention to a CD player. However, it is to be understood that the present invention is not limited to such an example alone and may be applied to any of other disk players designed for data reproduction from MD, CD-ROM and so forth.

Thus, in the rotation servo circuit of the present invention comprising a rough servo system and a phase lock servo system, the rough servo system pulls the phase approximately into its precision range and then is switched to the phase lock servo system which executes high precision control. And when the rough servo system is switched to the phase lock servo system in a seek mode, only the speed loop of the phase lock servo system is closed so that this servo system functions as a primary loop structure. Consequently, although the phase is somewhat disordered at the time of switching the servo system, the disk rotation speed is kept stable and the subcode can be read from the disk, so that any waste of time in reading the subcode is eliminated to eventually achieve remarkable reduction of the required seek time.

Accordingly, the rotation servo circuit of the present invention is optimal for a disk player which reproduces data from a CD-ROM or the like where a fast seek is particularly necessary.

Hereinafter a 5th embodiment of the present invention will be described in detail with reference to the accompanying drawing.

Figure 8:
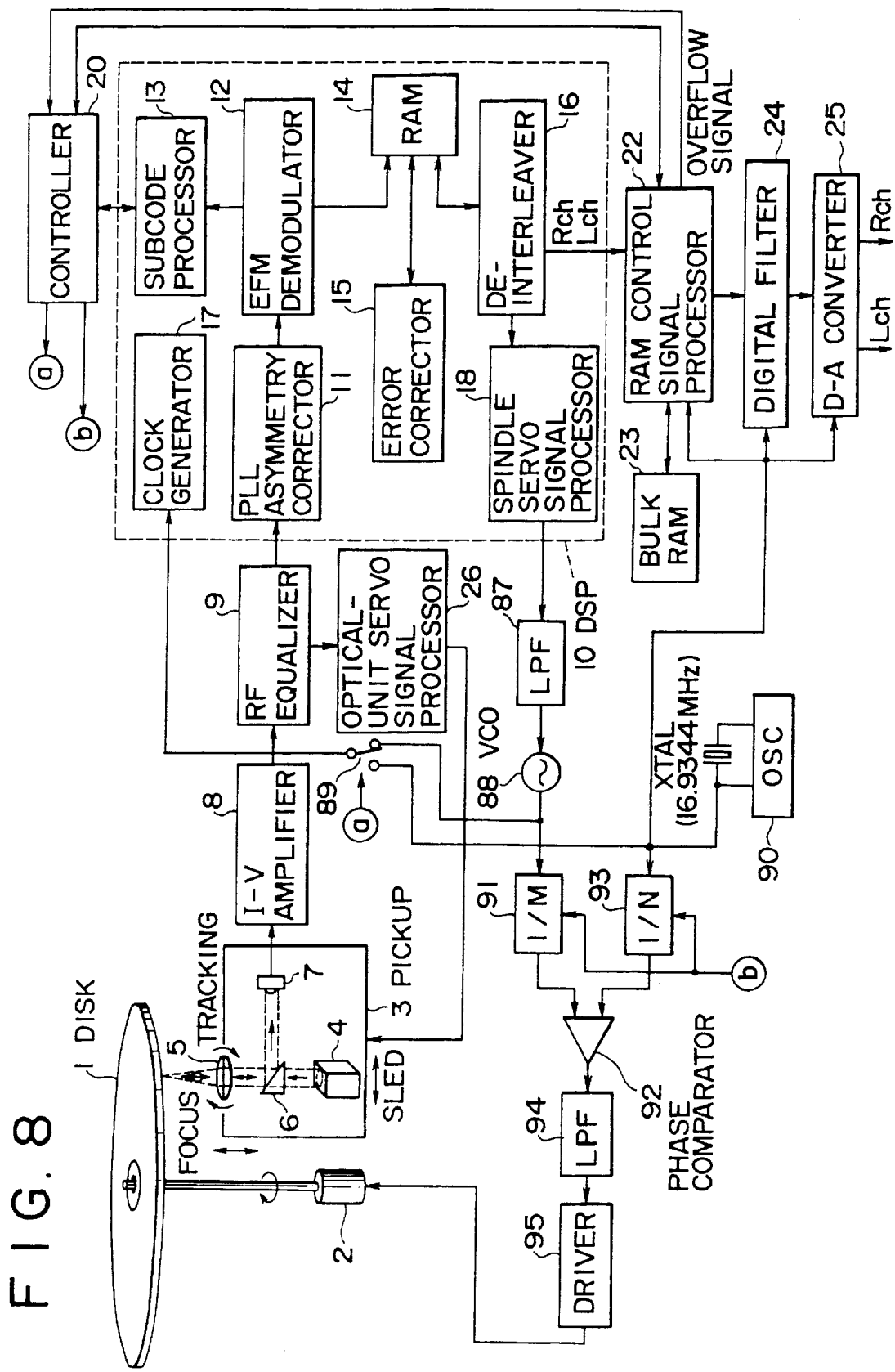
FIG. 8 is a block diagram of a control system corresponding to a 5th embodiment of the present invention applied to a shock-proof CD player.

FIG. 8 is a block diagram of the 5th embodiment representing a control system applied to, e.g., a shock-proof CD player.

In this diagram, a disk (CD) 1 is driven by a spindle motor 2, and recorded data are read from the disk 1 by an optical pickup (hereinafter referred to simply as pickup) 3.

The pickup 3 comprises a laser diode 4; an objective lens 5 for converging a laser beam, which is emitted from the laser diode 4, to form a data-reading light spot on the signal plane of the disk 1; a polarized beam splitter 6 for changing the travel direction of the laser beam reflected from the disk 1;

and a photo detector 7 for receiving the reflected laser beam. The pickup 3 is displaced in the radial direction of the disk by a driving source such as a sled feed motor (not shown).

The pickup 3 further comprises, although not shown, a tracking actuator for displacing the data-reading light spot to a record track on the disk 1 in the radial direction of the disk, and a focus actuator for moving the objective lens 5 along its optical axis.

The output signal of the pickup 3 is supplied to an I-V (current-voltage) amplifier 8 where the current signal is converted into a voltage signal, which is waveform-shaped in an RF equalizer 9 and then is supplied to a DSP (digital signal processor) 10.

Now a description will be given on how the signal is processed in the DSP 10.

First in a PLL asymmetry corrector 11, a binary signal is obtained with execution of asymmetry correction, and successive clock pulses are generated by a PLL (phase-locked loop) structure in synchronism with the edge of the binary signal. Here, "asymmetry" signifies a state where the center of the eye pattern of the RF signal deviates from the center of the amplitude.

Subsequently, EFM (eight-to-fourteen modulation) data are demodulated in an EFM demodulator 12, whereby digital audio data and an error correction-detection parity code are obtained, and simultaneously the subcode recorded immediately after the frame sync signal is also demodulated.

The subcode thus demodulated in the EFM demodulator 12 is supplied via a subcode processor 13 to a controller 20 which consists of a CPU.

The data after the EFM demodulation are once stored in a RAM 14, and error correction is executed in an error corrector 15 on the basis of the error correction-detection parity code. Then the error-corrected data are deinterleaved in a deinterleaver 16 so that the data are decoded from CIRC (cross interleave Reed-Solomon code).

The DSP 10 executes various signal processes on the basis of a system clock signal obtained from a clock generator 17.

The data processed in the DSP 10 are once stored in a bulk RAM 23 of a large capacity via a RAM control signal processor 22.

The data thus stored in the bulk RAM 23 are read out therefrom via the RAM control signal processor 22 at the normal output data rate in an ordinary CD player. And after being filtered through a digital filter 24, the data are converted into analog data in a D-A converter 25 and then are delivered as audio outputs of left (L) and right (R) channels.

The bulk RAM 23 is used for preventing a sound skip by maintaining the continuity of the reproduced audio data when any track jump has occurred during a reproduction mode due to some external disturbance such as shock.

Occurrence of a track jump is detected by the controller 20. More specifically, the controller 20 always monitors the subcode supplied from the subcode processor 13, and detects occurrence of a track jump by recognizing the discontinuity of a time code included in the subcode.

Upon occurrence of a track jump, the data-reading light spot of the pickup 3 is returned, under control of the controller 20, to the position immediately before the track jump, and then the data reproduction is resumed from that position.

Furthermore, under control of the RAM control signal processor 22, the audio data reproduced posterior to resumption of the reproduction are linked to the audio data reproduced immediately before occurrence of the track jump and stored in the bulk memory 23.

The DSP 10 further comprises a spindle servo signal processor 18 which detects the speed difference between the rotation speed of the disk 1 and a desired rotation speed thereof on the basis of a reproduced frame sync signal obtained from the disk 1 and then outputs a servo error signal (speed control signal) representing the detected speed difference.

An optical-unit servo signal processor 26 is employed for controlling each of the servo systems relative to the operation of the pickup 3, i.e., a tracking servo system for enabling the data-reading light spot to follow the record track on the disk 1, a focus servo system for continuously focusing the light spot on the signal plane of the disk 1, and a sled servo system for controlling the position of the pickup 3 in the radial direction of the disk.

The servo error signal from the spindle servo signal processor 18 is supplied as a control signal to a VCO (voltage-controlled oscillator) 88 via an LPF (low pass filter) 87. And an oscillation output of the VCO 88 is supplied as one input to a changeover switch 89.

A fixed clock signal of, e.g., 16.9344 MHz (44.1 kHz× 384) generated from a crystal oscillator 90 is supplied as another input to the changeover switch 89, which is selectively changed under control of the controller 20. Therefore the switch 89 selects either the oscillation output of the VCO 88 or the fixed clock signal of 16.9344 MHz and then supplies the selected one to a clock generator 17.

The clock generator 17 generates a system clock signal of a fixed frequency in response to the fixed clock signal supplied from the crystal oscillator 90, or generates a system clock signal of a frequency variable in accordance with the oscillation output of the VCO 88 supplied thereto.

The oscillation output of the VCO 88 is inputted to a 1/M frequency divider 91 where the frequency is divided into 1/M, and the frequency-divided signal is supplied as one input to a phase comparator 92. Meanwhile the fixed clock signal obtained from the crystal oscillator 90 is inputted to a 1/N frequency divider 93 where the frequency is divided into 1/N, and the frequency-divided signal serving as a reference clock signal is supplied as another input to the phase comparator 92.

Each of M and N is a variable and can be set to an adequate numerical value by the controller 20.

The phase comparator 92 detects the phase difference between the respective outputs of the 1/M frequency divider 31 and the 1/N frequency divider 93, and produces a phase difference signal corresponding to the detected phase difference.

The phase difference signal is supplied via an LPF 94 to a spindle driver 95 so as to serve as a driving signal for the spindle motor 2.

The fixed clock signal outputted from the crystal oscillator 90 is supplied to the RAM control signal processor 22, the digital filter 24 and the D-A converter 25 so as to be used for signal processing therein.

In the shock-proof CD player having the above-described construction, when the fixed clock signal from the crystal oscillator 90 is selected by the switch 89, the frequency of the system clock signal is fixed at 16.9344 MHz.

Meanwhile, when the frequency-divided output of the VCO 88 is selected by the switch 89, the system clock signal is so changed that the servo error signal outputted from the servo signal processor 18 becomes zero. More specifically, even if the rotation speed of the disk 1 is relatively loose, the system clock signal is changed in compliance with the disk rotation speed.

This signifies that the center frequency of the PLL in a PLL asymmetry corrector 11 is changed in compliance with the rotation speed of the disk 1, whereby the phase is lockable to any varied rotation speed in a wide range.

In other words, differing from the conventional data reproducing circuit where the system clock frequency is fixed and the spindle servo system so functions as to equalize the rotation speed of the disk 1 to a preset reference speed, the construction of the present invention mentioned above is contrived to execute a spindle servo control action in such a manner that the data reproducing circuit follows any rotation speed.

In a state where the oscillation output of the VCO 88 is selected by the switch 89, the play speed of the disk 1 is settable to a desired rate by properly selecting adequate numerical values of M and N in the 1/M frequency divider 91 and the 1/N frequency divider 93 respectively.

When M=N for example, the output frequency of the 1/M frequency divider 91 and that of the 1/N frequency divider 93 are equal to each other, so that the data reproduction is performed approximately at a 1-fold speed.

Regarding the oscillation output frequency Fa of the VCO 88 and the fixed clock frequency Fb of the crystal oscillator 90, there exists the following relationship.

$$Fa = (M/N) \cdot Fb \qquad \text{Eq. (4)}$$

When M/N=2, the oscillation output frequency Fa of the VCO 88 is twice the fixed clock frequency Fb of the crystal oscillator 90, so that the data reproduction is performed at a 2-fold speed.

Since required control of the rotation speed of the disk 1 may be relatively rough as described before, in case the rotation speed of the disk 1 is changed within a certain range that the VCO 88 can follow, it is possible to execute proper RF demodulation continuously. For this purpose, the numerical values of M and N in the 1/M frequency divider 91 and the 1/N frequency divider 93 may be continuously changed by the controller 20.

Normally the numerical values of M and N in the 1/M frequency divider 91 and the 1/N frequency divider 93 are set as M=N by the controller 20 to thereby select 1-fold speed play. And upon occurrence of a track jump due to an external disturbance such as shock, the numerical values are changed as M/N=2 to select 2-fold high speed play.

More specifically, the subcode is always monitored during 1-fold speed play, and occurrence of a track jump is recognized in response to detection of the discontinuity of a time code included in the subcode, whereby the operation is switched to 2-fold speed play immediately. It is to be noted here that the reproduction rate in a high speed play mode is not limited to a 2-fold speed alone.

Upon occurrence of a track jump, the controller 20 executes its control action for first searching the last subcode with respect to the continuity, then returning the pickup 3 to the position immediately before the track jump, and resuming the data reproduction from that position, while further controlling the RAM control signal processor 22 to link the reproduced audio data to that position.

The reason for selection of 2-fold speed play upon occurrence of a track jump will now be described below.

When a 4-Mbit memory for example is used as the bulk RAM 23, the rate of charging the bulk RAM 23 with the data is equal to the difference between the rate of writing the data in the bulk RAM 23 and the rate of reading the data therefrom, i.e., (2-fold rate−1-fold rate).

Since the data recorded on the disk 1 are composed of digital signals sampled at a frequency of 44.1 kHz and quantized with linear 16-bit strings, a time of approximately three seconds is required for charging the bulk RAM 23 as follows:

$$4{,}194{,}304 \text{ bits} / (44.1 \text{ kHz} \times 2(L,H) \times 16) \text{bits} \times 1 = 2.97 [\text{sec}] \qquad \text{Eq. (5)}$$

The above time of approximately three seconds indicates a period during which sound can be reproduced without any interruption if no data is reproduced from the disk 1 due to occurrence of a track jump. This time period raises substantially no problem in practical use, and it is determined by the storage capacity of the bulk RAM 23 and the play speed (2-fold speed in this embodiment), i.e., reproduction data rate in a high speed mode.

And during such a period of three seconds, there are executed a linking process for maintaining the continuity of the reproduced audio data and an operation of charging the bulk RAM 23 with the data.

If an overflow signal is outputted from the RAM control signal processor 22 during data reproduction in a 2-fold speed play mode, the controller 20 switches the reproduction to a 1-fold speed play mode in response to the overflow signal.

When the data reproduction is performed in a 2-fold speed play mode, the rate of writing the data into the bulk RAM 23 is higher than the rate of reading out the data therefrom, so that the bulk RAM 23 is soon caused to overflow. It is therefore necessary to always monitor the data quantity stored in the bulk RAM 23.

The operation of monitoring the data quantity in the bulk RAM 23 is performed in the RAM control signal processor 22.

More specifically, the RAM control signal processor 22 recognizes the last address of the data written in the bulk RAM 23 as a definite address, and also recognizes the address of the read data as an address 0, and then feeds the recognized definite address to the controller 20.

Further the RAM control signal processor 22 monitors the data quantity on the basis of such definite address, and supplies an overflow signal to the controller 20 when the data quantity has exceeded a preset value.

The controller 20 recognizes the definite address, which is obtained from the RAM control signal processor 22, as a definite subcode in correspondence to the subcode.

When the data reproduction is switched from a 1-fold speed play mode to a 2-fold speed play mode or vice versa, the controller 20 selects the fixed clock signal of the crystal oscillator 90 by changing the switch 89 upon arrival of the rotation speed of the disk 1 at the desired preset speed.

Consequently, there is attained a synchronism with the signal of the D-A converter 25, hence delivering a satisfactory audio output without wow or flutter.

In an ordinary CD player, an acceleration voltage or a deceleration voltage is applied from the spindle driver 95 to the spindle motor 2 for controlling the rotation speed of the disk 1 to keep the same at the desired preset speed. And when the rotation speed of the disk 1 has reached approximately the preset speed, predetermined voltage is applied to achieve a locked state.

It is defined here that the acceleration voltage is positive to the above predetermined voltage, while the deceleration voltage is negative to the above predetermined voltage.

However, in the shock-proof CD player of the present invention, rough control is sufficient for the spindle servo system as mentioned, so that it becomes possible to widely cut the deceleration component of the phase comparator 92 by the spindle driver 95 and to apply the predetermined voltage at the time of deceleration.

Due to such a contrivance, the energy consumption in driving the spindle motor 2 can be suppressed by an amount corresponding to the cut deceleration component, whereby the power consumption of the CD player can be eventually reduced.

Although the 5th embodiment described above represents an exemplary application to a shock-proof CD player, the present invention is effectively applicable to an ordinary CD player as well for the purpose of reading the data even when the rotation speed of the disk 1 is unstable, hence realizing fast access.

It is also to be understood that, in addition to the above example applied to a CD player, the present invention can be appropriately applied to any other disk player designed for reproduction of data from MD, CD-ROM or the like.

According to the present invention, as mentioned hereinabove, the output frequency of the VCO (oscillator means) is controlled in response to a speed control signal for a disk, while the oscillator output is supplied as a system clock signal to the signal processor, and the disk rotation speed is controlled in accordance with the phase difference between the oscillator output and the reference clock signal, whereby the system clock signal is so changed that the speed control signal becomes zero. Therefore, when the play mode is switched from a 1-fold speed to a 2-fold speed or vice versa, the spindle servo system can be locked even during a transition period of the rotation speed, whereby the data can be read out properly from the disk even during such a period.

Consequently, in a shock-proof disk player, its play mode is switched to a 2-fold speed only upon occurrence of a track jump caused by some external disturbance such as shock, and a fast operation of charging the bulk memory with the reproduced data is performed immediately, but a normal 1-fold speed is selected at any other time, so that the power consumption in the disk player is widely reducible, and the continuity of the reproduced data can be maintained exactly despite occurrence of any track jump.

Furthermore, the spindle servo system is kept free from an unlocked state, and the reproduced data can be stored in the bulk memory even during the transition period of the rotation speed. Therefore it is not necessary to employ a particular bulk memory of an extraordinarily great storage capacity, and a low-cost memory is sufficient to meet the requirements to eventually realize curtailment in the production cost of the shock-proof disk player.

In the present invention where the oscillation output of the VCO and the reference clock signal are frequency-divided respectively at variable ratios, the disk rotation speed is controlled on the basis of the phase difference between the frequency-divided outputs, so that the data reproduction speed can be set to any of 1-fold, 2-fold and higher speeds by adequately selecting proper frequency-division ratios.

Also in the present invention where a selector means is provided for selecting either the oscillation output of the VCO or the reference clock signal, first the output of the VCO is selected for rough control of the disk rotation speed, and subsequently the reference clock signal is selected after arrival of the disk rotation speed at a desired preset velocity, whereby a synchronism is attained with the signal of the D-A converter to thereby deliver a satisfactory audio output without wow or flutter.

What is claimed is:

1. A disk player comprising:

signal processing means for processing a reproduced signal obtained from a disk, detecting a speed difference between the rotation speed of the disk and a desired rotation speed thereof, and outputting a speed control signal corresponding to the detected speed difference;

oscillator means for supplying an oscillation output;

speed control means for detecting the phase difference between said oscillation output and a reference clock signal generated from said speed control signal, and controlling the rotation speed of the disk in accordance with the detected phase difference; and selector means for selecting one of said oscillation output and said reference clock signal as a system clock signal to said signal processing means.

2. The disk player according to claim 1, wherein said speed control means comprises:
   a first frequency divider means for dividing the frequency of said oscillation output at a variable ratio;
   a second frequency divider means for dividing the frequency of said reference clock signal at a variable ratio; and
   a phase comparator means for detecting the phase difference between the respective outputs of said first and second frequency divider means by comparing the phases of such two outputs with each other.

3. A disc player according to claim 1, further comprising:
   a bulk memory;
   a first servo means for controlling the rotation speed of a disk;
   a second servo means for controlling the operation of an optical pickup which reads recorded data from the disk, wherein the data are read from the disk at a first data rate and then are stored in said bulk memory, while the stored data are read out from said bulk memory at a second data rate lower than said first data rate;
   a memory control means for monitoring the data quantity stored in said bulk memory and outputting a first control signal when the data quantity has exceeded a first preset value, or outputting a second control signal when the data quantity has become smaller than a second preset value lower than said first preset value; and
   a servo control means for turning off said first and second servo means in response to said first control signal, or turning on said first and second servo means in response to said second control signal.

4. A disc player according to claim 1, further comprising:
   a bulk memory of a large capacity for storing the data read from the disk;
   a memory control means for monitoring the data quantity stored in said bulk memory and outputting an overflow signal when the data quantity has exceeded a preset value;
   a rotation servo circuit functioning to control the rotation speed of the disk in such a manner that the disk is driven normally in a low speed mode but is driven in a high speed mode upon occurrence of a track jump, and thereafter the disk is driven in the low speed mode again when said overflow signal is outputted, said rotation servo circuit comprising:
      a clock generator means for generating a first clock signal of a predetermined frequency;
      a frequency divider means for outputting a second clock signal by dividing the frequency of said first clock signal at a predetermined fixed ratio; and a gate means for selectively outputting said second clock signal in the low speed mode or said first clock signal in the high speed mode;
      wherein the operation of driving the disk is controlled on the basis of the clock signal outputted from said gate means.

5. A disk player having a first servo means for controlling the rotation speed of a disk and a second servo means for controlling the operation of an optical pickup which reads recorded data from the disk, wherein the data are read from the disk at a first data rate and then are stored in a bulk memory of a large capacity, while the stored data are read from said bulk memory at a second data rate lower than said first data rate, said disk player further comprising:
   a memory control means for monitoring the data quantity stored in said bulk memory and outputting a first control signal when the data quantity has exceeded a first preset value, and outputting a second control signal when the data quantity has become smaller than a second preset value lower than said first preset value;
   a servo control means for turning off said first and second servo means in response to said first control signal, or turning on said first and second servo means in response to said second control signal;
   signal processing means for processing a reproduced signal obtained from a disk, detecting a speed difference between the rotation speed of the disk and a desired rotation speed thereof, and outputting a speed control signal corresponding to the detected speed difference;
   oscillator means for supplying an oscillation output;
   speed control means for detecting the phase difference between said oscillation output and a reference clock signal generated from said speed control signal, and controlling the rotation speed of the disk in accordance with the detected phase difference; and
   selector means for selecting one of said oscillation output and said reference clock signal as a system clock signal to said signal processing means.

6. A disc player comprising:
   disc drive means for rotating a disc;
   an optical pick-up for reading information from the disc being driven by said disc drive means;
   circuit means operatively connected with said disc drive means and said optical pick-up, said circuit means for controlling at least one of said disc drive means and said optical pick up means in response to the an output of said optical pick up means, including:
   signal processing means for processing a signal from said optical pick-up;
   disk drive control means for controlling the rotational speed at which the disc is rotated by said disc drive means, said disc drive control means detecting the speed difference between the actual rotational speed and a desired rotational speed and for producing a speed control signal in accordance with the detected speed difference;
   a mass storage RAM for storing information read off the disc by said optical pick-up, the data being read from the disk at a first data rate and then stored in mass storage RAM, while the stored data is read out from said mass storage RAM at a second data rate lower than said first data rate;
   a memory control means for monitoring the data quantity stored in said mass storage RAM and outputting a first control signal when the data quantity has exceeded a first preset value, and outputting a second control signal when the data quantity has become smaller than a second preset value lower than said first preset value;
   a servo control means for turning off first and second servo means in said circuit means in response to said first control signal, and for turning on said first and second servo means in response to said second control signal;
   said signal processing means for processing a reproduced signal obtained from a disk, detecting a speed difference between the rotation speed of the disk and a desired rotation speed thereof, and outputting a speed control signal corresponding to the detected speed difference;

oscillator means for supplying an oscillation output;

speed control means for detecting the phase difference between said oscillation output and a reference clock signal generated from said speed control signal, and controlling the rotation speed of the disk in accordance with the detected phase difference; and selector means for selecting one of said oscillation output and said reference clock signal as a system clock signal to said signal processing means.

7. A disc player comprising:

disc drive means for rotating a disc;

an optical pick-up for reading information from the disc being driven by said disc drive means;

circuit means operatively connected with said disc drive means and said optical pick-up, said circuit means for controlling at least one of said disc drive means and said optical pick up means in response to an output of said optical pick up means, including:

signal processing means for processing a signal from said optical pick-up;

disk drive control means for controlling the rotational speed at which the disc is rotated by said disc drive means, said disc drive control means detecting the speed difference between the actual rotational speed and a desired rotational speed and for producing a speed control signal in accordance with the detected speed difference;

a mass storage RAM for storing information read off the disc by said optical pick-up, the data being read from the disk at a first readout rate and then stored in mass storage RAM, while the stored data is read out from said mass storage RAM at a second readout rate lower than said first data rate;

memory control means for monitoring the data quantity stored in said mass storage RAM and outputting a first control signal when the data quantity has exceeded a first preset value, and outputting a second control signal when the data quantity has become smaller than a second preset value lower than said first preset value;

servo control means for modifying an operation of each of first and second servo means in said circuit means in a first predetermined manner in response to said first control signal, and for modifying the operation of each of said first and second servo means in a second predetermined manner in response to said second control signal;

said signal processing means for processing a reproduced signal obtained from a disk, detecting a speed difference between the rotation speed of the disk and a desired rotation speed thereof, and outputting a speed control signal corresponding to the detected speed difference;

oscillator means for supplying an oscillation output;

speed control means for detecting the phase difference between said oscillation output and a reference clock signal generated from said speed control signal, and controlling the rotation speed of the disk in accordance with the detected phase difference; and selector means for selecting one of said oscillation output and said reference clock signal as a system clock signal to said signal processing means.

* * * * *